United States Patent [19]
Krieg et al.

[11] 3,914,338
[45] Oct. 21, 1975

[54] OPALESCENT METHYLMETHACRYLATE POLYMER BODIES

[75] Inventors: Manfred Krieg, Darmstadt; Norbert Suetterlin, Griesheim; Hans-Dieter Blitz, Darmstadt-Arheilgen, all of Germany

[73] Assignee: Rohm GmbH, Darmstadt, Germany

[22] Filed: Dec. 26, 1973

[21] Appl. No.: 428,011

[30] Foreign Application Priority Data
Dec. 30, 1972  Germany............................ 2264224

[52] U.S. Cl........... 260/876 R; 260/42.21; 260/885; 260/901
[51] Int. Cl.²......................................... C08L 51/00
[58] Field of Search................. 260/876 R, 885, 901

[56] References Cited
UNITED STATES PATENTS

| | | | |
|---|---|---|---|
| 3,288,886 | 11/1966 | Himei | 260/876 R |
| 3,644,249 | 2/1972 | Ide | 260/876 R |
| 3,781,232 | 12/1973 | Gaylord | 260/901 |

*Primary Examiner*—Paul Lieberman
*Attorney, Agent, or Firm*—Curtis, Morris & Safford

[57] ABSTRACT

Polymer particles consisting of a core of a cross-linked styrene polymer having a shell of a methyl methacrylate polymer graft copolymerized thereon.

Methods of making such polymer particles.

Opalescent bodies of a methyl methacrylate polymer having such polymer particles dispersed therein as the opalescing agent.

Method of making such opalescent bodies.

6 Claims, No Drawings

OPALESCENT METHYLMETHACRYLATE POLYMER BODIES

The present invention relates to certain cross-linked polystyrene polymer particles adaptable to dispersion in polymerizing and molten methacrylate polymers to render them opalescent; to methods of making said polymer particles; to opalescent methacrylate polymers comprising said cross-linked polystyrene polymers dispersed therein; and to methods of making said opalescent polymers.

Light-transmitting organic resins comprising methylmethacrylate and which contain finely-divided polystyrene particles therein play an important role in the lighting industry and for the preparation of skylights. To be sure, it is simple to render such acrylic resins uniformly opalescent while achieving a high degree of light dispersion by adding noncross-linked polystyrene to a monomer or monomer mixture to be polymerized in aamounts of, for example, 0.3 – 1.5 weight percent and then polymerizing the monomers in known fashion, for example in a flat chamber. At first, the polystyrene dissolves in the monomers. Then, as the polymerization proceeds, it separates — so long as its concentration is roughly within the limits mentioned above — in the finest and most uniform state of separation because polystyrene is not soluble in polymethylmethacrylate, i.e. is not compatible with polymethylmethacrylate. Sheets prepared in this manner can be shaped while in a thermoplastic condition to produce, for example, lamp coverings or skylight domes which are characterized by a high transparency to light and a good diffusing effect. On the one hand, lamp coverings of this kind give a high light output while, on the other hand, they nevertheless do not reveal the shape of the covered light source.

Polymethylmethacrylate prepared as a so-called "cast sheet" can be formed in a thermoelastic condition, for example at a temperature of 150°C. However, the polymer, if finely divided by grinding, for example, cannot be extruded or injection-molded. The temperature necessary to reach a molten fluid state is so high that thermal decomposition of the material sets in. By decreasing the molecular weight of the polymer, for example by a factor of 10, the melting region decreases sufficiently so that the material can be extruded through a nozzle in a molten fluid state or can be injection-molded. The processes just described have considerable practical significance for the production of large numbers of shaped bodies.

Rendering such a material opalescent by the use of polystyrene in the manner described above is, to be sure, possible. However, the opalescence completely or partially disappears during injection molding or extrusion under the influence of the shearing forces exerted by the worm screw and under the influence of the high working temperature. On extrusion or injection molding, the initially good light dispersing effect of the material is lost completely or in large part because of a decrease in the size of the polystyrene particles, detectable microscopically. This decrease in the particle size is caused particularly by an improved solubility and/or dispersion by shearing of the polystyrene in the polymethylmethacrylate at the working temperature.

The solubility of the particles contributing opalescence in a molten fluid acrylic glass can be reduced or kept constant by cross-linking the particles, i.e. by polymerizing the styrene with small amounts of a comonomer that contains at least two carbon-carbon double bonds in the molecule. Such cross-linked polystyrene particles can, however, only be introduced into acrylic glasses in the finely-divided and uniform state which is necessary for the desired light dispersing effect by using special techniques. If a cross-linked polystyrene is prepared as an emulsion polymer with the usual particle size of about 0.2 micron, is isolated from the emulsion by the usual technique, is mixed with a uniformly granulated polymethylmethacrylate, and this mixture is then extruded or injection molded, an opalescent material is obtained. This is, the solubilization of the particles contributing opalescence which is observed with non-cross-linked polystyrene is avoided. However, a material prepared in this manner shows only a very small light diffusing effect when the degree of light reflection is high. This result can be explained by the existence of a sharp boundary surface between the embedded emulsion polymer particles of cross-linked polystyrene and the polymethylmethacrylate phase which surrounds these particles. Because of the sharp boundary surface and the different indices of refraction of the two polymers, a considerable amount of the incident light is totally reflected.

As described in Japanese Pat. publication 11 834/71, the aforementioned disadvantage can be avoided by not mixing the cross-linked styrene emulsion polymer with the polymethacrylate mass to be formed, but by adding it to monomeric methylmethacrylate to be polymerized prior to polymerization. In order to avoid settling of the polymer particles during the polymerization, the mass to be polymerized must be stirred vigorously until its viscosity is sufficiently high that a sedimentation of the cross-linked solid particles no longer occurs. The danger of settling is first overcome at a degree of conversion of about 20 – 30 percent by weight.

It is evident that the apparatus required for the maintenance of an ideal dispersion of the cross-linked polystyrene particles during the first phase of the polymerization is considerable. The process, even if the necessary temperature and stirring conditions are maintained, is burdened with the risk that a uniform distribution of the opalescing particles in the polymer phase will not be attained and that, on extrusion or injection molding, the shaped body obtained will appear "cloudy." This is a disadvantage which is not acceptable, particularly in light coverings and the like. Further, an aggregation of the polystyrene particles can often lead to the formation of a rough surface on a shaped body. This is a disadvantage which runs contrary to the usual demand for a mirror-smooth surface, for example in a light covering.

According to the present invention it has now been found that emulsion polymers of cross-linked polystyrene can be prepared which are readily and uniformly dispersible in monomeric methylmethacrylate, in a monomer mixture predominantly comprising methylmethacrylate (i.e. more than 50 percent by weight thereof), in a melt of a polymethylmethacrylate, or in a melt of a copolymer predominantly comprising methylmethacrylate. The dispersed emulsion polymer will retain this ideal uniform distribution even after formation of a shaped mass by extrusion or injection molding.

The emulsion polymer is prepared in the following manner. In a first process step, a cross-linked polystyrene emulsion polymer is prepared. In a second process step, this polymer is provided by graft copolymerization with a shell or covering of polymethylmethacrylate or of a copolymer predominantly comprising methylmethacrylate.

In order to achieve the good light dispersing effect which is sought, it is necessary to control the size of the polystyrene core of the emulsion polymer prepared according to the invention so that its particle size is above the wavelength of visible light. At particle diameters of the polystyrene particles less than about 0.8 micron, the long wavelength limit of visible light, no, or only a little, light dispersion occurs. Thus, it is necessary to prepared the polystyrene particles with a diameter greater than about 0.8 micron.

Methylmethacrylate or a monomer mixture predominantly comprising methylmethacrylate, advantageously in the form of an aqueous emulsion, is added with stirring to an emulsion of cross-linked polystyrene particles in the presence of an emulsifier which is at a concentration beneath the critical micelle concentration and in the presence of a water-soluble polymerization accelerator. In this manner, chains of polymethylmethacrylate, or of the methylmethacrylate copolymer which forms, graft copolymerize onto the polystyrene cores with the formation of a surrounding shell or coating.

In another embodiment for the preparation of the double-layered emulsion copolymer, the cross-linked polystyrene in emulsion is swollen with monomeric methylmethacrylate or a corresponding monomer mixture and the monomer is then polymerized under the influence of a free radical accelerator soluble in the monomer, for example benzoyl peroxide or 2,2'-azobis(isobutyro)nitrile.

The polystyrene core which is later to be encased may advanatageously be prepared in a two-step process. In a first stage, a mixture of styrene and a cross-linking monomer is introduced with stirring into an aqueous phace in which is dissolved a water-soluble polymerization accelerator, for example ammonium persulfate. Latex particles having a size of up to 0.6 micron can be formed. Then, in a second stage, an emulsion of the aforementioned monomer mixture is added to the seed latex obtained in the first stage in the presence of an emulsifier and at a rate not exceeding the rate of polymerization until the desired particle size above about 0.8 micron is reached. In this embodiment, the concentration of the emulsifier must also be beneath the critical micelle concentration. This two-step process permits the manufacture of large polystyrene particles on a technical scale and more economically than can be done with a one-step process.

The cross-linked core of the emulsion polymer prepared according to the present invention can comprise styrene and a cross-linking monomer. However, the present invention also embraces polymers of substituted styrenes and copolymers which predominantly comprise stryene or a substituted styrene (i.e. to an extent of 50 percent of weight or more), a cross-linking monomer, and a balance of vinyl or vinylidene monomers copolymerizable with styrene. Advantageously, such latter comonomers are those whose homopolymers have an index of refraction greater than 1.50, which is similar to that of polystyrene ($n_D^{20} = 1.59$) and which is higher than the index of refraction of polymethylmethacrylate ($n_D^{20} = 1.492$). Exemplary of such monomers area vinyl toluene, N-vinyl carbazole, benzylacrylate, and benzylmethacrylate.

In principle, all monomeric compounds having at least two carbon-carbon double bonds in their molecules can be employed as cross-linking agents, i.e. glycol diacrylate, glycol dimethacrylate, allyl acrylate, allyl methacrylate, divinyl benzene, or triallyl cyanurate. Cross-linked polystyrenes and suitable cross-linking agents are well known in the art, for example from pages 68 – 71 of "Vinyl and Related Polymers," by Schildknecht (1952), from British Pat. No. 649,173, and from German Pat. publication DAS 1,158,269.

Cross-linking agents of the aforementioned type are present in a minimum amount of about 0.5 percent by weight, advantageously in an amount of from 2 – 5 percent by weight, based on the weight of styrene or the monomer mixture predominantly comprising styrene. However, cross-linking can also take place by some other mechanism, for example by the condensation of functional groups such as N-alkoxyalkyl methacrylamide groups, particularly N-lower-alkoxy-lower-alkyl methacrylamides such as methoxymethyl methacrylamide. This cross-linking mechanism is also well known in the art, for example from U.S. Pat. No. 2,978,433.

The shell surrounding the polystyrene core can comprise methylmethacrylate along or a mixture of this ester with smaller amounts of other vinyl or vinylidene monomers copolymerizing therewith, particularly the esters of acrylic acid and methacrylic acid having from 1 – 6 carbon atoms in the alcohol portion thereof, acrylonitrile, styrene, or vinyl acetate. It is preferred, but not necessary, that the composition of the polymer shell have the same composition as that of the monomer or monomer mixture in which the graft copolymerized particles are to be dispersed. While this promotes maximum compatibility of the particles and their polymer matrix, it is not critical to the success of the invention.

The volume fraction of the shell of the emulsion polymer prepared according to the present invention is at least about 30 percent of the total volume of the particles, and is advantageously about 50 percent. Within these limits, the compatibility of the shell and the polymer matrix is good. While the volume percentage of the shell may be as high as 90 percent of the total particle volume, the preparation of such particles is laborious and does not improve compatibility.

The polymer or copolymer forming this shell can be polymerized in the presence or absence of a regulator, i.e. a compound adjusting the chain length of the graft copolymer. Such regulators include, for example, mercaptans; disulfides such as diisopropylxanthogen disulfide or diphenyl disulfide; or also thioethers or thioacids as well as the esters of these acids, such as thioglycolic acid ethyl ester. In particular cases it may be useful weakly to cross-link the shell surrounding the polystryrene core.

The two-layered emulsion polymer prepared according to the present invention in an aqueous phase can be isolated by methods known in the art, for example by spray drying, and can be introduced as an opalescing agent in different ways into polymethylmethacrylate or into copolymers predominantly comprising methylmethacrylate. What has been said heretofore concerning the composition of the copolymer surrounding the polystyrene core pertains also to the composition of such methylmethacrylate copolymers.

The opalescing two-layered emulsion polymer can be added to an already-prepared polymethylmethacrylate or methylmethacrylate copolymer and homogeneously mixed therewith while the polymer or copolymer are in the form of granules produced by grinding or as a uniform granulate. An addition of the emulsion polymer in an amout of from 0.1 to 1 percent by weight imparts an opalescene sufficient for lighting purposes to bodies shaped by extrusion or injection molding in a thickness of from 2 – 5 mm, which thickness is conventional for light coverings and light domes. The emulsion can also be introduced into the polymer to be made opalescent in heated kneaders or between heated rolls, for example.

In another embodiment, pastes, almost like a "dye concentrate," can be prepared from the emulsion polymer and a polymerizable monomer or a plasticizer, wherein the amount of the emulsion polymer of the invention is, for example, about 50 percent by weight. This past can be introduced into a monomer being polymerized, disperses itself in the latter in an ideal fashion, and produces a polymer product in which, surprisingly, the desired complete dispersion of the particles is retained. In particular cases, a suspension of paste can be prepared from the emulsion polymer of the invention with an organic solvent and the suspension or paste so obtained can be introduced into the methylmethacrylate or corresponding monomer mixture to be polymerized, or can also be introduced into a molten polymer. This process is feasible if the solvent is removed during the course of working up, for example in a vacuum zone in the worm drive cylinder. Similarly, in particular cases even an aqueous dispersion of the two-layered polymer particles prepared according to the invention can be directly introduced into the mass to be made opalescent.

It is also possible to stir the emulsion polymer prepared according to the invention directly into polymerizing methylmethacrylate or a corresponding monomer mixture and to polymerize the uniformly opalescent mass obtained in this manner in a flat chamber, for example.

It must be mentioned that emulsion polymers according to the present invention can be introduced into formed bodies obtained by polymerization in situ, by extrusion, or by injection molding in far higher concentrations than has been possible in previously known processes without risk of an aggregation or coagulation of the particles imparting opalescence.

The surprising discovery that the two-layered emulsion polymer of the invention — in contrast to an emulsion of a cross-linked but unencased polystyrene — distributes itself into a mass to be made opalescent in an ideal fashion, whether the emulsion polymer is added to a monomer or monomer mixture to be polymerized or to a melt of polymethylmethacrylate or of a methylmethacrylate copolymer, and that this degree of distribution is retained in the final finished body with achievement of a high light dispersion, can be explained as follows.

The affinity of the polymethylmethacrylate or corresponding copolymer which surrounds the particle cores for the monomer or polymer phase surrounding the particles causes a rapid wetting of the "encased" particles by a surrounding polymerizing or molten polymer mass and thus leads to a rapid and uniform distribution of these particles in the surrounding medium. The "shell" applied to the core according to the present invention does not permit agglomeration of the polystyrene particle, i.e. these are present in the end product discretely distributed in the polymer phase. The total reflection of a portion of incident light observed in the prior art when cross-linked, but unencased, polystyrene particles are present does not place, or takes place only to a minor extent, at the "poorly defined" or diffuse phase boundary surface between the encased polystyrene cores of the present invention and the adjacent polymer phase. An opalescent organic glass prepared according to the present invention thus shows an outstanding light dispersing effect in combination with high light permeability, i.e. the ratio of transmission to reflection of the incident light is particularly advantageously in favor of transmission.

A better understanding of the present invention and of its many advantages will be had by referring to the following specific Examples, given by way of illustration.

In part (A), i.e. in Examples 1 – 3, emulsion polymers which fall outside the scope of the present invention are prepared. In part (B), i.e. in Examples 4 – 7, emulsion polymers according to the process of the present invention are prepared. In part (C), i.e. in Examples 8 – 10, the emulsion polymers prepared in (A) are used to render an acrylate resin opaloscent, and in part (D), i.e. in Examples 11 – 16, the emulsion polymers prepared in (B) are employed for the same purpose.

A. THE PREPARATION OF EMULSION POLYMERS OUTSIDE THE SCOPE OF THE PRESENT INVENTION

EXAMPLE 1

Preparation of the Core

Step 1

320 parts by weight of de-ionized water and 1.6 parts by weight of a paraffin sulfonate having 15 carbon atoms in the paraffin chain are introduced into a heatable polymerization apparatus comprising a 2 liter vessel equipped with a paddle stirrer and thermometer. The materials are heated to 80°C. Then, 0.16 part of ammonium perioxy disulfate is added and an emulsion comprising 640 parts of de-ionized water, 2.0 parts of the aformentioned paraffin sulfonate, 627.2 parts of styrene, 12.8 parts of glycol dimethacrylate, and 1.44 parts of ammonium peroxy disulfate is added dropwise over a period of 2 hours. After addition is complete, the polymerization is concluded by heating for 30 minutes at 80°C.

The dispersion so obtained is free of coagulate and has a solids content of 39 – 40 percent by weight. The average particles diameter is 1320 Angstroms.

Step 2

50 parts of the dispersion obtained in Step 1 and 350 parts of de-ionized water are introduced into a polymerization apparatus like that of Step 1 and are heated to 80°C. Then, 0.96 part of ammonium peroxy disulfate is added and a mixture of 313.6 parts of styrene and 6.4 parts of glycol dimethacrylate is added dropwise over 2 hours. Thereafter, the polymerization is completed within 30 minutes. The dispersion so obtained is free of coagulate and has a solids content of 48 – 49 percent.

The average particle size is about 3200 Angstroms, i.e. about 0.3μ.

Recovery

The dispersion obtained in Step 2 is brought to a pH of 10 by the addition of 1 percent sodium hydroxide and is then dried in a circulating hot air oven at 80°C.

EXAMPLE 2

Preparation of the Core

Step 1 - (as in Example 1).
Step 2 - (As in Example 1)
Step 3

800 parts of the dispersion obtained in Step 2 of Example 1 are introduced into a polymerization apparatus like that of Example 1 and heated to 80°C. Then, 0.16 part of ammonium peroxy disulfate is added and an emulsion comrising 320 parts of methylmethacrylate, 0.72 part of ammonium peroxy disulfate, 480 parts of de-ionized water, and 1.0 part of a paraffin sulfonate having 15 carbon atoms in the paraffin chain is added dropwise over 2 hours. At the end of the addition, polymerization is completed by heating for 60 minutes at 80°C.

The dispersion so obtained is free of coagulate and has a solids content of 39–40 percent. The average particle diameter is about 4000 Angstroms, i.e. about 0.4μ.

The product is isolated as in Example 1.

EXAMPLE 3

Preparation of the Core

Step 1

1200 parts of de-ionized water are heated to 80°C. in a two liter vessel equipped with a paddle stirrer and thermometer. 6.0 parts of ammonium peroxy disulfate and 5 parts of styrene are then added. After 5 minutes, a further 295 parts of styrene are added dropwise over a period of 1 hour and then a temperature of 80°C. is maintained for a further 60 minutes.

The coagulate-free dispersion so obtained has a solids content of 19 – 20 percent and an average particle size of about 6000 Angstroms, i.e. about 0.6μ.

Step 2

45 parts of the dispersion obtained in Step 1 are heated together with 280 parts of de-ionized water to 80°C. in a polymerization apparatus as described in Step 1. 0.18 part of ammonium peroxy disulfate is then added and an emulsion comprising 477.8 parts of styrene, 800 parts of de-ionized water, 0.68 part of sodium lauryl sulfate, and 1.6 parts of ammonium peroxy disulfate is added dropwise over four hours. After addition is complete, the mixture is heated for 1 hour more at 80°C. Then, after the addition of 0.45 part of ammonium peroxy disulfate, it is heated for a further hour at 80°C.

The coagulate-free dispersion so obtained has a solids content of 29 – 30 percent and an average particle size of about 20,000 Angstroms, i.e. about 2μ.

Preparation of the Shell

Step 3

500 parts of the dispersion prepared in Step 2 are introduced together with 850 parts of de-ionized water into a polymerization apparatus as described above. 150 parts of methylmethacrylate are than stirred in. After about 15 hours, 6 parts of azoisobutyric acid dinitrile are introduced under an inert gas atmosphere. The mixture is heated to 80°C. and stirred for 3 at this temperature.

The coagulate-free dispersion obtained has a solids content of 29 – 30 percent and an average particle size of about 30,000 Angstrons, i.e. about 3μ.

Recovery

The dispersion obtained in Step 3 is adjusted to a pH of 10 with a 1 percent sodium hydroxide and dried at 80°C. in a circulating hot air oven.

B. THE PREPARATION OF EMULSION POLYMERS ACCORDING TO THE INVENTION

EXAMPLE 4

Preparation of the Core

Step 1

1200 parts of de-ionized water are introduced into a heatable polymerization apparatus comprising a 2 liter vessel equipped with a paddle stirrer and thermometer, and are heated to 80°C. Then, 6.0 parts of ammonium peroxy disulfate and 5 parts of a mixture comprising 95 percent by weight of styrene and 5 percent by weight of glycol dimethacrylate as a cross-linking agent are added. After 5 minutes, a remaining 295 parts of the 95 percent styrene — 5 percent glycol dimethacrylate are added dropwise over a period of 1 hour. After addition is concluded, the mixture is stirred for 60 minutes at 80°C., cooled, and filtered through a stainless steel sieve.

The dispersion obtained in this manner is free of coagulate and has a solids content of 19 – 20 percent by weight. The average particle diameter is about 6500 – 7000 Angstroms, i.e. 0.65 –7μ.

Step 2

280 parts of de-ionized water and 45.0 parts of the disersion obtained in Step 1 are introduced into a polymerization vessel like that of Step 1 and are heated to 80°C. Then, 0.18 part of ammonium peroxy disulfate is added and, over a period of four hours, an emulsion comprising 454 parts of styrene, 23.8 parts of glycol dimethacrylate, 800 parts of de-ionized water, 0.68 part of sodium lauryl sulfate, and 1.6 parts of ammonium peroxy disulfate is added dropwiise. After addition is complete, polymerization is concluded by heating at 80°C. for 1 hour, adding 0.45 part of ammonium peroxy disulfate, and heating for a further hour at 80°C.

The dispersion so obtained is free of coagulate and has a solids content of 29 – 30 percent. The average particle diameter is about 20,000 – 25,000 Angstroms, i.e. about 2 – 2.5μ.

Preparation of the Shell

Step 3

500 parts of the dispersion obtained in Step 2 and 850 parts of de-ionized water are introduced into a polymerization apparatus like that discribed in Step 1 and are thoroughly mixed. Then, 150 parts of methylmethacrylate are added and stirred in. After about 15 hours, 6 parts of azoisobutyric acid dinitrile are added under an inert gas atmosphere. The mixture is then heated to 80°C. and stirred for 3 hours at 80°C.

The diersion so obtained is free of coagulate and has a solids content of 29 – 30 percent by weight. The average particle size is about 30,000 – 35,000 Angstoms, i.e. about 3 – 3.5μ.

Recovery

The dispersion obtained in Step 3 is adjusted to a pH of 10 with 1 percent sodium hydroxide and dried at 80°C. in a circulating hot air oven. A fine dry powder is obtained, the particle size of which is about 30,000 – 35,000 Angstroms. The residual water content is less than 1 percent.

EXAMPLE 5

The procedure of Example 4 is followed. However, in Steps 1 and 2, a monomer mixture of 70 percent by weight of styrene, 25 percent by weight of benzyl methacrylate, and 5 percent by weight of butane diol dimethacrylate is employed instead of a monomer mixture of 95 percent by weight of styrene and 5 percent by weight of glycol dimethacrylate.

EXAMPLE 6

The procedure of Example 4 is followed. However, in the third step, a mixture of 90 parts by weight of methylmethacrylate and 60 parts by weight of styrene is employed instead of 150 parts of methylmethacrylate.

EXAMPLE 7

A. The procedure of Example 4 is followed. However, instead of using glygol dimethacrylate in Steps 1 and 2, the same amount of N-methoxymethyl methacrylic acid amide is used as a cross-linking agent. The dry powder, in deviation from Example 4, is "tempered" by heating for 24 hours at 100°C.

B. Proceeding as in Step 3 of Example 4, instead of 150 parts of methyl methacrylate, a mixture of 141 parts of methyl methacrylate and 9 parts of methyl acrylate is employed for preparation of the shell.

C. USE OF THE EMULSION POLYMERS PREPARED IN (A) (EXAMPLES 1 – 3) FOR RENDERING AN ACRYLIC RESIN OPALESCENT

EXAMPLE 8

98 parts of polymethylmethacrylate (molecular weight = 100,000 – 200,000) in the form of a ground granulate or a granulate of uniform size are homogeneously mixed in a mixing apparatus with 2 parts by weight of the styrene emulsion polymer prepared according to Example 1. Optionally, auxiliary agents such as plasticizers, can be also mixed in.

The mixture is subsequently extruded.

Plates prepared from the extrudate in an injection press showed very low light diffusion, light transmission, and high reflectance.

EXAMPLE 9

Shaped bodies prepared according to Example 8 from a mixture of 96 parts of polymethylmethacrylate and 4 parts of a styrene emulsion polymer prepared as in Example 2 also showed very low light diffusion. However, in contrast with the bodies formed according to Example 8, they showed very slight reflection with high light transmission.

EXAMPLE 10

A shaped body prepared according to Example 8 from a mixture of 99.5 parts of polyethylmethacrylate and 0.5 part of a styrene emulsion polymer prepared according to Example 3 corresponded in its optical properties with the shaped body of Example 9.

D. THE USE OF THE EMULSION POLYMERS ACCORDING TO (B) (EXAMPLES 4 – 7) FOR RENDERING ACRYLIC RESIN OPALESCENT

EXAMPLE 11

A shaped body was prepared as in Example 8 from a mixture of 99.6 parts of polymethylmethacrylate and 0.4 part of a styrene emulsion polymer prepared according to Example 4.

The following data were measured on a 3mm-thick injection molded plate:

Degree of transmission (CIE standard light source A) = 81.4 percent

Degree of reflection (CIE standard light source A) = 10.0 percent

Median angle (according to DIN 5036, No. 2, Mar., 1970) = 10°

Analogous shaped bodies made opalescent with the styrene emulsion polymers of Examples 5 – 7 corresponded in their optical properties with the aforementioned shaped body.

EXAMPLE 12

25 parts of the styrene emulsion polymer prepared according to Example 4 were suspended, with good stirring, in 75 parts of methylmethacrylate. The homogeneous polymer/monomer paste was introduced into a melt of polymethylmethacrylate by a pump in the melting zone of an extruder in such an amount that the concentration of the emulsion polymer was 0.4 percent in the shaped end product. The methylmethacrylate introduced by the paste was removed from the polymer melt in a vacuum zone. The opalescent formed mass has the same optical properties as those in Example 11.

EXAMPLE 13

5 parts of the styrene emulsion polymer prepared according to Example 4 were dispersed in 95 parts of a mixture of 90 parts of methylmethacrylate and 10 parts of polymethylmethacrylate. After the addition of 0.1 part of azoisobutyric acid dinitrile, the mixture was polymerized for 5 hours at 50°C. and for 3 hours at 100°C. in a glass chamber 3 mm thick.

The polymethylmethacrylate plate prepared in this manner contained the polystyrene particles in a homogeneous distribution and had outstanding light dispersing properties.

If a polystyrene soluble in methylmethacrylate is employed instead of the styrene emulsion polymer of Example 4, coagulation of the polystyrene precipitating during the polymerization occurs and the finished polymer plate appears "cloudy," i.e. the polystyrene is not present in an ideal distribution.

EXAMPLE 14

Proceeding as in Example 8, an opalescent body is prepared from 0.4 part of a styrene emulsion polymer prepared according to Example 7A and from 99.6 parts of a copolymer prepared from 94 parts of methyl methacrylate and 6 parts of methyl acrylate having a molecular weight of 150000.

The optical properties of this shaped mass correspond to those of the bodies of Example 11.

EXAMPLE 15

Proceeding as in Example 8, an opaloscent body is prepared from 0.5 part of the styrene emulsion polymer prepared according to Example 6 and 99.5 parts of a copolymer having a molecular weight of 180000 prepared form 90 parts of methyl methacrylate and 10 parts of styrene. The product has good optical properties like those described for the materials in Example 11.

EXAMPLE 16

2 parts of the styrene emulsion polymer prepared according to Example 4 are dispersed in 98 parts of a monomer mixture comprising 86 parts of methyl methacrylate, 3 parts of vinyl acetate, 1 part of dibutylphthalate, and 10 parts of polymethylmethacrylate. After the addition of 0.015 part of dyes (i.e. 0.01 part of Ceres blue and 0.005 part of Orasol Brilliant blue) and 0.1 part of azodiisobutyric acid dinitrile, the mixture was polymerized as described in Example 13.

A blue-colored sheet having light dispersing properties is obtained.

What is claimed is:

1. An opalescent body of polymethylmethacrylate or of a copolymer comprising at least 50 percent by weight of methyl methacrylate, the balance being a vinyl or vinylidene comonomer copolymerizable therewith, said body having opalescing particles dispersed therein in an amount from about 0.1 to 5 percent by weight of said body, said particles consisting essentially of a core, greater than about 0.8 in diameter, of crosslinked polystyrene or of a cross-linked copolymer comprising at least 50 percent by weight of styrene, the balance being a vinyl or vinylidene comonomer forming a homopolymer whose index of refraction $n_D^{20}$ is greater than 1.50, said core being cross-linked by the presence therein of about 0.5 to 5 percent, by weight of styrene or monomer mixture predominantly comprising styrene, of a member selected from the group consisting of N-alkoxy alkyl methacrylamides and ethylenically unsaturated monomers having at least two carbon-carbon double bonds in the molecule, said core further being surrounded by a graft-copolymerized shell of polymethylmethacrylate or of a copolymer comprising at least 50 percent by weight of methyl methacrylate, the balance being a vinyl or vinylidene comonomer copolymerizable therewith, the volume fraction of said shell being at least 30 percent and up to 90 percent of the total volume of said particles.

2. The method of making an opalescent body as in claim 1 comprises dispersing said particles into monomeric methyl methacrylate or a monomer mixture comprising at least 50 percent by weight of methyl methacrylate and then polymerizing said monomer or monomer mixture.

3. The method as in claim 2 wherein said particles are introduced into the monomer or monomer mixture in the form of a paste comprising said particles and methyl methacrylate or a plasticizer.

4. The method of making an opalescent body as in claim 1 which comprises dispersing said particles in molten polymethylmethacrylate or in a molten copolymer comprising at least 50 percent by weight of methyl methacrylate and then cooling to resolidify the polymer or copolymer.

5. The method as in claim 4 wherein said particles are introduced into the molten polymer or copolymer in the form of a paste comprising said particles and methyl methacrylate or a plasticizer.

6. An opalesent body as in claim 1 wherein said cross-linked polymer core is cross-linked by the presence therein of at least 0.5 percent by weight of glycol diacrylate or glycol dimethacrylate.

* * * * *

UNITED STATES PATENT OFFICE
CERTIFICATE OF CORRECTION

Patent No. 3,914,338                    Dated October 21, 1975

Inventor(s) Manfred Krieg et al.

It is certified that error appears in the above-identified patent and that said Letters Patent are hereby corrected as shown below:

Column 9, line 64, replace "polyethylmethacrylate" by -- polymethylmethacrylate --.

Column 11, line 28 (Claim 1), after "0.8" insert --micron--.

Signed and Sealed this tenth Day of February 1976

[SEAL]

Attest:

RUTH C. MASON
Attesting Officer

C. MARSHALL DANN
Commissioner of Patents and Trademarks